United States Patent
Hoey et al.

(12) 
(10) Patent No.: US 6,506,710 B1
(45) Date of Patent: Jan. 14, 2003

(54) VISCOELASTIC SURFACTANTS AND COMPOSITIONS CONTAINING SAME

(75) Inventors: Michael D. Hoey, Maplewood, NJ (US); Ralph Franklin, Danbury, CT (US); Douglas M. Lucas, West Hempstead, NY (US); Maurice Dery, Putnam Valley, NY (US); Randy E. Dobson, Spring, TX (US); Michael Engel, White Plains, NY (US); James F. Gadberry, Danbury, CT (US); Ramanair S. Premachandran, Saddle Brook, NJ (US); Glenda Del Carmen Vale, Corsicana, TX (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/553,196

(22) Filed: Apr. 20, 2000

Related U.S. Application Data

(63) Continuation of application No. 08/995,275, filed on Dec. 17, 1997, now Pat. No. 6,239,183.

(51) Int. Cl.$^7$ .................. B01J 13/00; C07C 235/00; C09K 7/02; E21B 43/26
(52) U.S. Cl. .................. 507/242; 166/270; 166/308; 252/77; 507/130; 507/132; 507/245; 507/922; 507/925; 510/433; 510/504; 516/102; 524/921; 554/55; 564/204; 564/215
(58) Field of Search .................. 516/102; 510/433, 510/504; 252/77; 524/921; 564/204, 215; 554/55; 507/129, 130, 132, 240, 245, 922, 242, 925; 166/270, 308

(56) References Cited

U.S. PATENT DOCUMENTS

| | | | | |
|---|---|---|---|---|
| 2,748,193 A | * | 5/1956 | Scudi et al. | 564/511 X |
| 3,306,858 A | * | 2/1967 | Oberle | |
| 3,849,348 A | * | 11/1974 | Hewitt | 510/433 X |
| 4,077,990 A | * | 3/1978 | Prodo et al. | 554/55 |
| 4,113,631 A | * | 9/1978 | Thompson | 507/922 X |
| 4,654,158 A | * | 3/1987 | Shepherd, Jr. | 516/102 X |
| 4,735,731 A | * | 4/1988 | Rose et al. | 507/129 X |
| 4,737,296 A | | 4/1988 | Watkins | |
| 4,745,976 A | | 5/1988 | Harwell et al. | 166/273 |
| 4,806,256 A | | 2/1989 | Rose et al. | 252/71 |
| 4,960,934 A | | 10/1990 | Smith et al. | 564/298 |
| 5,101,903 A | | 4/1992 | Llave et al. | 166/294 |
| 5,149,463 A | * | 9/1992 | Peterson | 516/102 X |
| 5,246,698 A | * | 9/1993 | Leshchiner et al. | 516/102 X |
| 5,462,689 A | * | 10/1995 | Choy et al. | 510/433 X |
| 6,177,388 B1 | * | 1/2001 | Cheung et al. | 510/433 X |
| 6,239,183 B1 | * | 5/2001 | Farmer et al. | 516/102 |

FOREIGN PATENT DOCUMENTS

| | | | | |
|---|---|---|---|---|
| EP | 0 070 076 A2 | | 1/1981 | C11D/1/86 |
| EP | 0 474 284 A1 | | 3/1992 | E21B/43/22 |
| GB | 1 212 782 | | 11/1970 | C08G/17/16 |
| GB | 1 404 335 | | 8/1975 | F17D/5/02 |
| GB | 2 018 863 A | | 10/1979 | E21B/43/27 |
| GB | 2 119 358 A | | 11/1983 | C04B/21/00 |
| JP | 05093181 | | 4/1993 | C09K/3/00 |
| JP | 09003491 | | 1/1997 | A61K/7/075 |
| JP | 10197306 | | 7/1998 | G01F/1/68 |
| WO | WO94/17154 | * | 8/1994 | 507/130 |
| WO | 97/33960 | | 9/1997 | C11D/1/75 |
| WO | WO 99/32572 | | 7/1999 | C09K/7/02 |

OTHER PUBLICATIONS

International Search Report of PCT/US01/12816, dated Nov. 26, 2001.

* cited by examiner

Primary Examiner—Richard D. Lovering
(74) Attorney, Agent, or Firm—Ralph J. Mancini

(57) ABSTRACT

A method for controlling the rheology of aqueous systems, particularly for those intended for underground use, includes injecting an aqueous viscoelastic fluid containing a surfactant gelling agent into the system. The viscoelastic surfactant composition of the invention comprises, as a gelling agent, at least one fatty aliphatic amidoamine oxide in a glycol solvent. The composition also maintains the levels of free fatty acid and free amine within critical parameters in order to achieve superior performance. The additives may be incorporated in the viscoelastic fluid to tailor its use in stimulation fluids, drilling muds, fracture fluids, and in applications such as permeability modification, gravel packing, cementing, and the like.

34 Claims, No Drawings

VISCOELASTIC SURFACTANTS AND COMPOSITIONS CONTAINING SAME

This is a continuation in part of U.S. application Ser. No. 08/995,275 filed on Dec. 17, 1997, now U.S. Pat. No. 6,239,183.

BACKGROUND OF THE INVENTION

1. Field of the Invention

The present invention relates to gelling agent compositions, to viscoelastic compositions containing them and to methods and agents for modifying the rheological behavior of aqueous fluids such as used in well drilling and similar subterranean operations.

2. Background of the Art

Fluids are used in well drilling operations, for example, to cool and lubricate the drilling bit, to carry away drilled solids and other debris, to suspend drilled cuttings and other debris when the fluid column is static, to control subsurface pressure, to prevent squeezing or caving of formations, to suspend propping agents, and to minimize damage to any potential production zone. In stimulation (hydraulic) operations fluids are used to transfer pressure from one location to another.

Drilling fluids and stimulation fluids can be water based or oil based. Typically, water based drilling and stimulation fluids can include one or more aqueous fluid thickening agents, lubricants, and corrosion inhibitors. The aqueous fluid can be fresh water or brine, and can include aqueous solutions of acids, alkali, lower alkanols (methanol, ethanol, and propanol), glycols, and the like, provided that the water miscible liquid does not adversely affect the viscoelastic properties of the aqueous fluid. Also included are emulsions of immiscible liquids in water and aqueous slurries of solid particulates such as clay.

Viscoelasticity is a desirable rheological feature in drilling fluids, workover or completion fluids, and stimulation fluids which can be provided by fluid modifying agents such as polymeric agents and surfactant gelling agents. Viscoelastic fluids are those in which the application of stress gives rise to a strain that approaches its equilibrium value relatively slowly. Therefore, viscoelastic fluids may behave as a viscous fluid or an elastic solid, depending upon the stress on the system. Viscoelasticity in fluids that is caused by surfactants can manifest itself in shear rate thinning behavior. For example, when such a fluid is passed through a pump or is in the vicinity of a rotating drill bit, the fluid exhibits low viscosity. When the shearing force is abated the fluid returns to its more viscous condition. This is because the viscoelastic behavior is caused by surfactant aggregations in the fluid. These aggregations will adjust to the conditions of the fluid, and will form different aggregation shapes under different shear stress. Thus one can have a fluid that behaves as a viscous fluid under low shear, and a low viscosity fluid under a higher shear. A viscoelastic fluid also has an elastic component which manifests itself in yield value. This allows a viscoelastic fluid to suspend an insoluble material, for example sand, for a greater time period than a viscous fluid of the same apparent viscosity.

Another function of fluid modifying agents in oil drilling applications is in permeability modification. Secondary recovery of oil from reservoirs involves supplementing by artificial means the natural energy inherent in the reservoir to recover the oil. For example when the oil is stored in porous rock it is often recovered by driving a pressurized fluid, such as brine, through one or more drill holes (injecting wells) into the reservoir formation to force the oil to a well bore from which it can be recovered. However, rock often has areas of high and low permeability. The brine injected can finger its way through the high permeability areas leaving unrecovered oil in the low permeability areas.

Various methods have been employed to solve this problem. For example, U.S. Pat. No. 5,101,903 discloses a method for reducing the permeability of the more permeable zone of an underground formation having non-uniform permeability. The method comprises injecting into the formation a blend of surfactant and an alcohol, the blend being introduced in an amount effective to reduce the permeability of the more permeable zone of the formation. The preferred surfactant is an amine oxide such as dimethyltallowamine oxide delivered in water. A disclosed alcohol is isopropanol. The method may include the further step of injecting an alcohol slug following injection of the surfactant and alcohol blend.

U.S. Pat. No. 4,745,976 discloses a method for partially or completely blocking the high permeability regions of a reservoir. The technique is based upon the ability to induce phase changes in surfactant solutions by changing counterions or by adding small quantities of different surfactants. An aqueous solution of an ionic surfactant may have a viscosity only slightly different from brine but an increase in the salt concentration or addition of a multivalent counterion can cause the surfactant to form a solid precipitate or form a gel-like structure of high viscosity. In the method of U.S. Pat. No. 4,745,976, a first surfactant solution is injected into the formation followed by a water-soluble spacer fluid followed by a second surfactant solution. In situ mixing of the two surfactant solutions is affected by the tendency of different surfactant types to travel at different velocities through the reservoir. The compositions of the first and second surfactants solutions are chosen so that upon mixing, a precipitated or gel-like structure will form blocking the high permeability zone of the reservoir.

SUMMARY OF THE INVENTION

In accordance with the present invention, the rheology of an aqueous fluid is modified by the method which comprises adding to an aqueous fluid an amount of gelling agent sufficient to form a viscoelastic fluid, the gelling agent and/or viscoelastic surfactant being an amidoamine oxide of the general formula I:

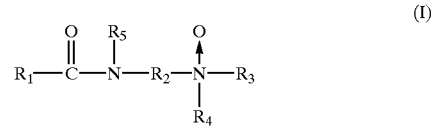

(I)

wherein $R_1$ is a saturated or unsaturated, straight or branched chain aliphatic group of from about 7 to about 30 carbon atoms, $R_2$ is a divalent alkylene group of 2–6 carbon atoms which may be linear or branched, substituted or unsubstituted, and $R_3$ and $R_4$ are independently $C_1$–$C_4$ alkyl or hydroxyalkyl groups or together they form a heterocyclic ring of up to six members, and $R_5$ is hydrogen or a $C_1$–$C_4$ alkyl or hydroxyalkyl group.

The aforementioned gelling agents advantageously provide clear gels that do not undergo phase separation over extended periods of time and exhibit high heat stability.

DESCRIPTION OF THE PREFERRED EMBODIMENTS

The present invention generally relates to a gelling agent composition, to an aqueous viscoelastic composition comprising said gelling agent, to a method for manufacturing said gelling agent composition, to a method of stimulating and/or modifying the permeability of an underground formation with the gelling agent and/or aqueous viscoelastic compositions of the present invention, and to drilling fluids, completion fluids, workover fluids and the like comprising the gelling agent composition of the present invention. The gelling agent compositions of the present invention can also be employed to gel most other aqueous systems, such as those utilized in cleaning formulations, water-based coatings, detergent formulations, personal care formulations, water based asphalt formulations and the like.

An aqueous viscoelastic composition especially useful in underground applications can be obtained by adding one or more gelling agents such as described below. The concentration of gelling agent in the aqueous composition is generally in the range of from about 0.5% to about 10% by weight, preferably from about 2% to about 8% by weight, and more preferably from about 4% to about 6% by weight based on the total weight of the composition. The aqueous composition of the invention can include inorganic salts and various additives as described hereinbelow. Such a composition is advantageously injected into, for example, an underground system for use in drilling, stimulation (such as hydraulic fracturing), for permeability modification of underground formations, and for uses such as gravel packing, and cementing.

The gelling agents disclosed and described herein are surfactants that can be added singly or they can be used as a primary component in the aqueous viscoelastic composition of the present invention.

The gelling agent composition of the present invention comprises at least one glycol and at least one amidoamine oxide having the structure

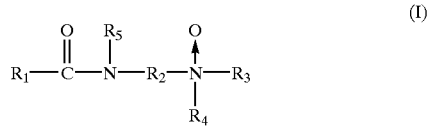

wherein $R_1$ is a saturated or unsaturated, straight or branched chain aliphatic group of from about 7 to about 30 carbon atoms, preferably from about 14 to about 21 carbon atoms. More preferably, $R_1$ is a fatty aliphatic derived from natural fats or oils having an iodine value of from about 1 to about 140, preferably from about 30 to about 90, and more preferably from 40 to about 70. $R_1$ may be restricted to a single chain length or may be of mixed chain length such as those groups derived from natural fats and oils or petroleum stocks. Preferred are tallow alkyl, hardened tallow alkyl, rapeseed alkyl, hardened rapeseed alkyl, tall oil alkyl, hardened tall oil alkyl, coco alkyl, oleyl, or soya alkyl. $R_2$ is a straight chain or branched, substituted or unsubstituted divalent alkylene group of from 2 to about 6 carbon atoms, preferably, of 2 to 4 carbon atoms and more preferably of 3 carbon atoms. $R_3$ and $R_4$ are the same or different and are selected from alkyl or hydroxyalkyl groups of from 1 to about 4 carbon atoms and are preferably hydroxyethyl or methyl. Alternatively, $R_3$ and $R_4$ in the amidoamine oxide of formula I together with the nitrogen atom to which these groups are bonded form a heterocyclic ring of up to 6 members. Finally, $R_5$ is hydrogen or a $C_1$–$C_4$ alkyl or hydroxyalkyl group. Illustrative of these amidoamine oxides are those derived from:

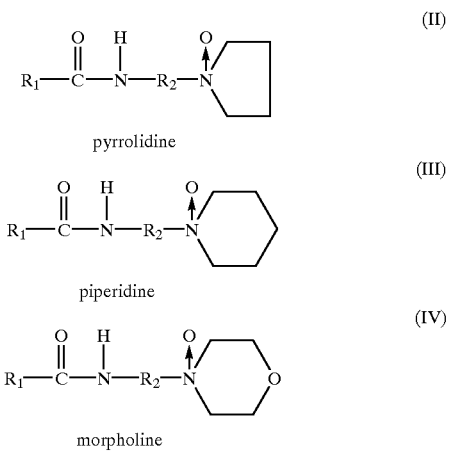

Other examples of amidoamine oxides contemplated by the present invention include but are not limited to those selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof. Preferred specific examples of the amidoamine oxides of the present invention include but are not limited by the following: tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof.

The amidoamine oxide gelling agent composition of the present invention can generally be prepared by dissolving a tertiary amidoamine of general formula (II) in a gloycol solvent.

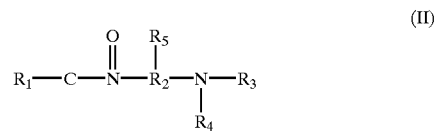

wherein $R_1$ is a saturated or unsaturated, straight or branched chain aliphatic group of from about 7 to about 30 carbon atoms, $R_2$ is a divalent alkylene group of from 2 to about 6 carbon atoms, $R_3$ $R_4$ are the asme or different and are alkyl, or hydroxyalkyl of from 1 to about 4 carbon atoms, or $R_3$ and $R_4$ together with the nitrogen atom to which they are bonded from a heterocyclic ring of up to 6 members, followed by reaction with hydrogen peroxide in the presence of an oxidation catalyst, wherein the reaction temperature is maintained at leass than about 70° C. Examples of suitable oxidation catalysts include, but are not limited to, carbon dioxide, a carbon salt, a bicarbonate salt and mixtures thereof.

In a preferred embodiment, a pourable, concentrated amine oxide gelling agent composition in accordance with the present invention is prepared by reacting a tertiary amine with a concentrated hydrogen peroxide in a miscible glycol as a solvent. The amount of glycol to be added is determined by the concentration of the amine oxide solution to be prepared.

The glycols employed are high flash point solvents that solubilize the tertiary amine, amine oxide and water from the hydrogen peroxide reagent. If water is used as the solvent, the result is a gel/paste with a maximum amine oxide concentration of 20–30%. If one were to employ an alcohol such as isopropanol as a solvent, then the product will have a low flash point and will have to be classified as a flammable. Also, alcohols such as isopropanol appear to modify the structure of the surfactant aggregates formed thereby negatively affecting the ability of the amine oxide solution to thicken solutions. The use of glycols in accordance with the present invention overcomes the disadvantages of the prior art and allows for the preparation of concentrated amine oxide viscoelastic compositions having a superior thickening ability.

In the alternative, the amine oxide gelling agent composition in accordance with the present invention can be prepared by reacting a tertiary amine with a concentrated hydrogen peroxide in an alcohol solvent such as isopropanol but, as mentioned above, since alcohol solvents such as isopropanol have a deleterious effect on the performance of the gelling agent, it is preferred that the alcohol be removed from the final product and replaced with a glycol solvent.

Although any glycol solvent can be employed in accordance with the present invention, the most preferred glycols include but are not limited to ethylene glycol, butylene glycols, diethylene glycol, polypropylene glycol, polyethylene glycol, glycerin, propylene glycols, tetramethylene glycol, tetramethylethylene glycol, trimethylene glycol, and the like. Propylene glycols (e.g., 1,2 propanediol) are the most preferred glycols.

In the present process it is also important to minimize the amount of free fatty acid formed since free fatty acid is harmful to the gelling agents of the present invention. More specifically, the gelling agents in accordance with the present invention give greater viscosity to an aqueous solution if the amine oxide has less than 5% free fatty acid, preferably less than 3% free fatty acid, and most preferably, less than 1% free fatty acid. In order to achieve these low levels of free fatty acid, it is important to utilize an oxidation catalyst in the aforementioned process for preparing the gelling agents of the present invention. Preferred oxidation catalysts include, but are not limited to dissolved carbon dioxide, a carbonate salt, a bicarbonate salt and the like. Catalyst systems such as this are described in U.S. Pat. No. 4,960,934 which is incorporated herein by reference.

The use of a sequesterant is also useful. This helps to stabilize the product at higher temperatures during storage. A preferred sequesterant is a phosphonate salt, such as the phosphonate salts sold by Solution™ under the trade name of Dequest®. A preferred product is Dequest® 2010. The sequestrant can be added either during the process for making the gelling agent composition of the present invention or at any point thereafter.

The gelling agent composition of the present invention also gives greater viscosity to an aqueous solution if the amine oxide contains less than 10%, but greater than 0.5% free amine, preferably between 8% and 2% free amine, and most preferably between about 6% and 3% free amine.

The concentration of gelling agent composition preferably ranges from about 1% to about 10% depending on the desired viscosity, more preferably about 3% to 8%, and most preferably about 4% to about 6%.

The aqueous viscoelastic composition of the present invention comprising the gelling agent composition of the present invention can also contain inorganic salts (e.g., brines which contain alkali metal salts, alkaline earth metal salts, and/or ammonium salts), and other viscosity modifying additives (e.g., such as cellulosics). Brines gelled with such agents are advantageously used as water diversion agents, pusher fluids, fracture fluids, drilling muds, gravel-packing fluids, drill-in fluids, work-over fluids, completion fluids, and the like.

The gelling agent compositions of the present invention can also be utilized to gel most other aqueous systems, including but not limited to those utilized in cleaning and sanitizing formulations, water-based coatings (e.g. paints), detergent formulations, personal care formulations, water-based asphalt systems, concrete, building products, (e.g., motars, plasters, joint compounds, and the like), agricultural drift control agents and the like.

When used in stimulation applications, the viscoelastic fluid can optionally include lubricants, corrosion inhibitors and various other additives.

Lubricants can include metal or amine salts of an organo sulfur, phosphorus, boron or carboxylic acid. Typical of such salts are carboxylic acids of 1 to 22 carbon atoms including both aromatic and aliphatic acids; sulfur acids such as alkyl and aromatic sulfonic acids and the like; phosphorus acids such as phosphoric acid, phosphorous acid, phosphinic acid, acid phosphate esters, and analogous sulfur homologs such as the thiophosphoric and dithiophosphoric acid and related acid esters; mercaptobenzothiozole; boron acids including boric acid, acid borates and the like; and lauric acid amine salts.

Corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized aromatic carboxylic acids (e.g., 4-(t-butyl)-benzoic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Stimulation fluids can also include additives for specific applications to optimize the performance of the fluid. Examples include colorants; dyes; deodorants such as citronella; bactericides and other antimicrobials; chelating agents such as an ethylene diamine tetraacetate sodium salt or nitrilo triacetic acid; anti-freeze agents such as ethylene glycol and analogous polyoxyalkylene polyols; anti-foamants such as silicone-containing agents and shear stabilizing agents such as commercially available polyoxyalkylene polyols. Anti-wear agents, friction modifiers, anti-slip and lubricity agents may also be added. Also included are extreme pressure additives such as phosphate esters and zinc dialkyl dithiophosphate.

The surfactants disclosed and described herein are advantageously used as gelling agents for fracture fluids. Such fluids create channels or fractures in oil producing reservoir zones in order to improve oil production by providing a high permeability pathway from the reservoir rock to the well bore. Typically, in low permeability zones, fracture fluids are pumped at pressures exceeding the overburden weight of the rock formation thereby causing splits and fractures in the formation rock. Propping agents (e.g. particulate matter) are added to the fluid to prevent the induced fractures from closing after fluid induction by propping open the induced splits and fractures. Gelling agents are added to the fluid to transport such propping agents and to reduce fluid leakoff. In higher permeability zones, different methods may be used, but fluid thickeners are often utilized.

The gelling agents disclosed herein provide several advantages over the polymers (e.g., polysaccharides) currently used as gelling agents for downhole fluids. For example, the compounds set forth herein (particularly the alkyl amidoamine oxide, and more particularly, alkyl amidopropylamine oxide) when used as gelling agents for downhole fluid produce less residue on the formation which could result in formation damage during and after the downhole process. Also, it is easier to produce the gelled fluid as compared with polymers which typically must be hydrated, and the gelled fluid can be designed to "break" with formation temperatures or other factors such as oxidizers or acids. One can also "break" the gelled fluid by using solvents such as hydrocarbons, alcohols, or even oil from the formation. The gelling agents set forth below are useable over a wide range of temperature depending on chain length, and can assist in removing oil from the formation.

A suitable downhole fluid can include fresh water or seawater or a brine containing sodium chloride (typically 1–5% by weight) and/or calcium chloride (typically 0.5–3% by weight), to which optionally about 3% to about 10%, and preferably about 4% to about 6%, of one of more gelling agents in accordance with the present invention.

For purposes of selectively modifying the permeability of underground rock formations one or more gelling agent can first be blended with water, preferably including glycol, to form a viscoelastic fluid which is then injected into the rock formation in an amount effective to reduce the permeability of the more permeable zone(s) of the formation. Optionally, the concentration of gelling agent in the fluid can be from about 0.5% to about 10%, preferably from about 2% to about 8%, and more preferably from about 4% to about 6% by weight. It is also important that the gelling agent contain less than about 1% free fatty acid and between about 2 and 8% free amine for optimum performance. Use of an alcohol such as isopropanol should be avoided since it destroys the viscoelastic character of the gelling agents of the present invention.

The following non-limiting examples are illustrative of the method of modifying the rheological behavior of aqueous fluids in accordance with the present invention.

EXAMPLE 1

Preparation of the Gelling Agent in Accordance with the Present Invention

Procedure

Charge (8.4 lbs.) of tallowamidopropyldimethylamine (TAPA), (7.0 lb) solvent (propylene glycol or isopropanol) and (1.8 gm) Dequest 2010 to a 3 gallon reactor. Determine the net equivalent weight (NE) of the tallowamidopropylamine. Then charge (70 gm) ammonium bicarbonate. Heat reactor to 50° C. and purge reactor headspace with $N_2$. A 3% molar excess of 70% $H_2O_2$ is then slowly added while maintaining the temperature of the reaction at 55–60° C. Reaction is very exothermic. $H_2O_2$ is then added at ~8.5gm/min (60 minutes minimum addition). Good temperature control is required in order to minimize unwanted byproducts. After $H_2O_2$ addition is complete, the reaction mixture is digested at 55° C. until the free amine is within specifications.

EXAMPLE 2

Viscosity Comparative Testing

All viscosity sample(s) were run on a Brookfield DV II+ Rotational viscometer with cone and plate geometry sensor. The sensor used for all tests is CP52. The procedure used to calibrate the gap is reported in the operating manual. The gap was calibrated separately for each range of temperature studied. All viscosity measurements were made at the constant rotational speed of 0.5 rpm. The instrument was calibrated at 0.5 rpm using viscosity standards of 1000, 5000, 10,000, 15,000 and 20,000 CP. The samples used were 6% active (amine oxide formulation) in 3% aqueous KCl solutions (w/w). The sample were prepared according to the following procedure: 6 grams of material was placed in a flask, with constant stirring, with 94 grams of aqueous KCl (4%) and the mixture was blended together at 60° C. for one hour. Then the sample was kept overnight in an oven at 60° C. A white opaque gel was formed. This gel was used to run viscosity tests using the Brookfield. Typically an aliquot volume of 1.5 ml was used for measurements. All viscosity numbers are reported as centipoise (cps).

The use of propylene glycol as a solvent gives unexpected benefits in viscosity. The state of the art discloses amine oxides made in water or an alcohol solvent, such as isopropanol. It is difficult if not impossible to make a high active amidoamine oxide formulation in water, because a 10% active solution generates a stiff gel and a paste is formed at below 20% active in water. When isopropanol is used, concentrated solutions can be made, but the presence of the isopropanol has a deleterious effect upon the use of the product to generate gels in water. In order to demonstrate the harmful affect of alcohol on the present system and to demonstrate the unexpectedly superior results of the present invention, two samples prepared in accordance with the general procedure of Example 1 were prepared: one with a glycol according to the present invention, and one in isopropanol according to the state of the art. The viscosity of these test samples was then compared. The data are tabulated in Table I, below.

TABLE I

| Temperature (° C.) | TAPAO in IPA 30% active (cps) | TAPAO in PG 50% active (cps) |
| --- | --- | --- |
| 25 | 650 | 18,070 |
| 30 | 600 | 14,578 |
| 35 | 450 | 10,240 |
| 40 | 200 | 12,530 |
| 45 |  | 15,400 |
| 50 |  | 16,600 |
| 55 |  | 14,780 |
| 60 |  | 8,691 |
| 65 |  | 3,270 |
| 70 |  | 1,866 |
| 75 |  | 789 |
| 80 |  | 447 |

As clearly seen from the above data, the high active amidoamine oxide formulation formulated in glycol in accordance with the present invention demonstrate an unexpectedly superior viscosity profile compared to high active amidoamine oxide compositions formulated in isopropanol.

It has also been found that the amount of free amine and fatty acid in the amidoamine oxide had dramatic effects upon the viscosity of the gel generated by the aqueous viscoelastic composition of the present invention. This is shown in Table II, below. The preferred formulation has a free amine of greater than 1% but less than 10% and a fatty acid content of less than 5%. Samples A–K are produced using the general procedure of Example 1 with propylene glycol as the solvent.

TABLE II

Free amine variation. All viscosity results are in cps.

| Temp (° C.) | Sample A, Free amine 0.2%, Fatty acid 1.8% | Sample B Free amine, 1.7%, Fatty acid 1.8% | Sample C Free amine, 2.9%, Fatty acid 1.8% | Sample D Free amine, 3.0%, Fatty acid, 1.8% | Sample E Free amine, 8.0%, Fatty acid, 2.3% |
|---|---|---|---|---|---|
| 25 | 9,234 | 16,900 | 18,070 | 18,200 | 18,850 |
| 30 | 11,640 | 15,100 | 14,578 | 13,850 | 14,870 |
| 35 | 11,900 | 12,680 | 10,240 | 10,760 | 11,086 |
| 40 | 11,720 | 12,120 | 12,530 | 13,670 | 13,980 |
| 45 | 11,500 | 12,350 | 15,400 | 15,100 | 15,400 |
| 50 | 9,450 | 13,970 | 16,600 | 15,610 | 17,100 |
| 55 | 6,850 | 14,220 | 14,780 | 16,100 | 17,300 |
| 60 | 3,041 | 8,718 | 8,691 | 8,691 | 12,846 |
| 65 | 1,179 | 4,368 | 3,270 | 4,400 | 4,827 |
| 70 | 470 | 2285 | 1,866 | 2,746 | 1,245 |
| 75 | 423 | 1,237 | 789 | 1,935 | 1,200 |
| 80 | 400 | 445 | 447 | 1,270 | 895 |

TABLE III

Fatty acid variation. All viscosity results are in cps

| Temp (° C.) | Sample F, Free amine 0.2%, Fatty acid 1.8% | Sample G Free amine, 1.3%, Fatty acid 2.6% | Sample H Free amine, 1.3%, Fatty acid 6.5% | Sample I Free amine, 3.6%, Fatty acid, 6.2% | Sample J Free amine, 7.2%, Fatty acid, 6.3% |
|---|---|---|---|---|---|
| 25 | 9,234 | 16,750 | 11,530 | 12,200 | 14,780 |
| 30 | 11,640 | 18,540 | 9,897 | 12,660 | 15,660 |
| 35 | 11,900 | 15,350 | 6,727 | 8,570 | 10,780 |
| 40 | 11,720 | 13,820 | 3,962 | 6,303 | 6,967 |
| 45 | 11,500 | 14,610 | 1,050 | 1,493 | 2,285 |
| 50 | 9,450 | 18,560 | 387 | 589 | |
| 55 | 6,850 | 18,975 | | | |
| 60 | 3,041 | 13,730 | | | |
| 65 | 1,179 | 8,238 | | | |
| 70 | 470 | 3,696 | | | |
| 75 | 423 | 2,500 | | | |
| 80 | 400 | 1,880 | | | |

What is claimed is:

1. A gelling agent composition which comprises at least one glycol as a solvent, and at least one amidoamine oxide gelling agent of general formula (I)

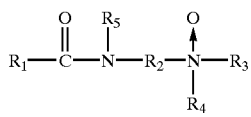

(I)

wherein $R_1$ is a saturated or unsaturated, straight or branched chain aliphatic group of from about 7 to about 30 carbon atoms, $R_2$ is a straight or branched chain, saturated or unsaturated divalent alkylene group of from 2 to about 6 carbon atoms, $R_3$ and $R_4$ are the same or different and are alkyl or hydroxyalkyl of from 1 to about 4 carbon atoms, or $R_3$ and $R_4$ together with the nitrogen atom to which they are bonded form a heterocyclic ring of up to 6 members, and $R_5$ is hydrogen or a alkyl or hydroxyalkyl group of from 1 to about 4 carbon atoms, wherein said gelling agent composition contains less than about 10% free fatty acid.

2. The gelling agent composition of claim 1 which contains from about 2–10% free amine.

3. The gelling agent composition of claim 1 wherein $R_1$ is an aliphatic group of from about 15 to about 21 carbon atoms, and $R_2$ is an alkylene group of from about 2 to about 4 carbon atom.

4. The gelling agent composition of claim 1 wherein $R_1$ is an aliphatic group derived from natural fats and oils having an iodine value of from about 1 to about 140, and $R_2$ is an alkylene group having 3 carbon atoms.

5. The gelling agent composition of claim 1 wherein $R_1$ is selected from the group consisting of tallow alkyl, hardened tallow alkyl, rapeseed alkyl, hardened rapeseed alkyl, tall oil alkyl, hardened tall oil alkyl, coco alkyl, stearyl, oleyl and soya alkyl, $R_2$ is an alkylene group having three carbon atoms, and $R_3$ and $R_4$ are each methyl.

6. The gelling agent composition of claim 1 wherein $R_3$ and $R_4$ together with the amine nitrogen to which they are bonded form a heterocyclic group having a 5-member ring derived from pyrrolidine.

7. The gelling agent composition of claim 1 wherein $R_3$ and $R_4$ together with the amine nitrogen to which they are bonded form a heterocyclic group having a 6-member ring derived from piperidine.

8. The gelling agent composition of claim 1 wherein $R_3$ and $R_4$ together with the amine nitrogen to which they are bonded form a heterocyclic group having a 6-member ring derived from morpholine.

9. The gelling agent composition of claim 1 wherein said at least one glycol solvent is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

10. The gelling agent composition of claim 1 wherein said amidoamine oxide is selected from the group consisting of tallow amidoalkylamine oxide, hardened tallow amidoalkylamine oxide, rapeseed amidoalkylamine oxide, hardened rapeseed amidoalkylamine oxide, tall oil amidoalkylamine oxide, hardened tall oil amidoalkylamine oxide, coco amidoalkylamine oxide, stearyl amidoalkylamine oxide, oleyl amidoalkylamine oxide, soya amidoalkylamine oxide, and mixtures thereof.

11. The gelling agent composition of claim 1 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof.

12. The gelling agent composition of claim 1 wherein said amidoamine oxide is selected from the group consisting of tallowamidopropyl dimethylamine oxide, hydrogenated tallowamidopropyl dimethylamine oxide, soya amidopropyl dimethylamine oxide, oleyl amidopropyl dimethylamine oxide, erucyl amidopropyl dimethylamine oxide, rapeseed amidopropyl dimethylamine oxide, hydrogenated rapeseed amidopropyl dimethylamine oxide, tall oil amidopropyl dimethylamine oxide, hydrogenated tall oil amidopropyl dimethylamine oxide, $C_{14}$–$C_{22}$ saturated or unsaturated fatty acid amidopropyl dimethylamine oxides, and mixtures thereof, and said glycol is selected from the group consisting of ethylene glycol, butylene glycols, diethylene glycol, propylene glycols, polyethylene glycol, polypropylene glycol, glycerin, tetramethylene glycol, tetramethylethylene glycol, trimethylene glycol and mixtures thereof.

13. An aqueous viscoelastic composition comprising the gelling agent composition of claim 1.

14. The composition of claim 13 comprising from about 0.5% to about 10% by weight of the gelling agent composition.

15. The composition of claim 14 comprising from about 2% to about 8% by weight of said gelling agent composition.

16. A method of fracturing a subterranean formation comprising the step of pumping an aqueous viscoelastic composition through a wellbore and into a subterranean formation at a pressure sufficient to fracture the formation, wherein said aqueous viscoelastic composition is the composition of claim 13.

17. A drilling fluid, completion fluid, or workover fluid comprising the gelling agent composition of claim 1.

18. The composition of claim 1 further comprising at least one sequesterant.

19. The composition of claim 18 wherein said sequesterant is a phosphonate salt.

20. A method for controlling the rheology of an aqueous system comprising:
   a) providing a gelling agent composition comprising one or more amidoamine oxide gelling agents of the general formula (I)

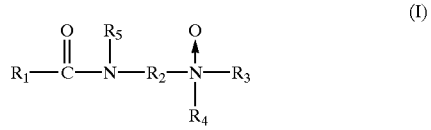

(I)

wherein $R_1$ is a saturated or unsaturated, straight or branched chain aliphatic group of from about 7 to about 30 carbon atoms, $R_2$ is a saturated or unsaturated, substituted or unsubstituted divalent alkylene group of from 2 to about 6 carbon atoms, $R_3$ and $R_4$ are the same or different and are alkyl or hydroxyalkyl of from 1 to about 4 carbon atoms, or $R_3$ and $R_4$ together with the nitrogen atom to which they are bonded form a heterocyclic ring of up to 6 members, and $R_5$ is hydrogen or a alkyl or hydroxyalkyl group of from 1 to about 4 carbon atoms, wherein said amidoamine oxide is in a glycol solvent and contains less than about 10% free fatty acid, and
   b) adding said gelling agent composition to an aqueous fluid in an amount effective to form a viscoelastic composition.

21. The method of claim 20 wherein said gelling agent composition contains from about 2 to about 10% free amine.

22. The method of claim 20 wherein $R_1$ is an aliphatic group of from about 15 to about 21 carbon atoms, and $R_2$ is an alkylene group of from about 2 to about 4 carbon atoms.

23. The method of claim 20 wherein $R_1$ is an aliphatic group derived from natural fats and oils having an iodine value of from about 10 to about 100, and $R_2$ is an alkylene group having 3 carbon atoms.

24. The method of claim 20 wherein $R_1$ is selected from the group consisting of tallow alkyl, hardened tallow alkyl, rapeseed alkyl, hardened rapeseed alkyl, tall oil alkyl, hardened tall oil alkyl, coco alkyl, stearyl, oleyl and soya alkyl, $R_2$ is an alkylene group having three carbon atoms, and $R_3$ and $R_4$ are each methyl.

25. The method of claim 20 wherein $R_3$ and $R_4$ together with the amine nitrogen to which they are bonded form a heterocyclic group having a 5-member ring derived from pyrrolidine.

26. The method of claim 20 wherein $R_3$ and $R_4$ together with the amine nitrogen to which they are bonded form a heterocyclic group having a 6-member ring derived from piperidine.

27. The method of claim 20 wherein $R_3$ and $R_4$ together with the amine nitrogen to which they are bonded form a heterocyclic group having a 6-member ring derived from morpholine.

28. The method of claim 20 wherein the gelling agent is present in the aqueous fluid at a concentration of from about 0.5% to about 10% by weight.

29. The method of claim 28 wherein the gelling agent is present in the aqueous fluid at a concentration of from about 2% to about 8% by weight.

30. The method of claim 20 wherein said gelling agent further comprises at least one sequesterant.

31. The method of claim 30 wherein said sequesterant is a phosphonate salt.

32. A method for making the amidoamine oxide gelling agent composition of claim 1 which comprises dissolving a tertiary amidoamine of general formula (II) in a glycol solvent

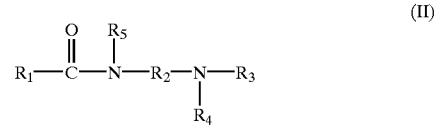

(II)

wherein $R_1$ is a saturated or unsaturated, straight or branched chain aliphatic group of from about 7 to about 30 carbon atoms, $R_2$ is a divalent alkylene group of from 2 to about 6 carbon atoms, $R_3$ and $R_4$ are the same or different and are alkyl or hydroxyalkyl of from 1 to about 4 carbon atoms, or $R_3$ and $R_4$ together with the nitrogen atom to which they are bonded form a heterocyclic ring of up to 6 members, followed by reaction with hydrogen peroxide in the presence of an oxidation catalyst, wherein the reaction temperature is maintained at less than about 70° C.

33. The method of claim 32 wherein said oxidation catalyst is selected from the group consisting of carbon dioxide, a carbonate salt, a bicarbonate salt and mixtures thereof.

34. The method of claim 32 wherein said composition further comprises a sequesterant.

* * * * *